PROPORTIONAL SPACE RECORDING DEVICES

Original Filed June 4, 1956 8 Sheets-Sheet 1

INVENTOR
ROBERT T. BLAKELY
BY
J W Armbruster
ATTORNEY

PROPORTIONAL SPACE RECORDING DEVICES

Original Filed June 4, 1956

8 Sheets-Sheet 2

INVENTOR.
ROBERT T. BLAKELY

BY

J W Armbruster
ATTORNEY

INVENTOR.
ROBERT T. BLAKELY
BY
J W Armbruster
ATTORNEY

INVENTOR.
ROBERT T. BLAKELY
BY
J W Armbruster
ATTORNEY

INVENTOR
ROBERT T. BLAKELY

BY J W Armbruster
ATTORNEY

Sept. 7, 1965 R. T. BLAKELY 3,204,540

PROPORTIONAL SPACE RECORDING DEVICES

Original Filed June 4, 1956 8 Sheets-Sheet 6

INVENTOR.
ROBERT T. BLAKELY

BY

J. W. Armbruster
ATTORNEY

PROPORTIONAL SPACE RECORDING DEVICES

Original Filed June 4, 1956 8 Sheets-Sheet 7

*INVENTOR.*
ROBERT T. BLAKELY

*BY*

J W Armbruster
ATTORNEY

PROPORTIONAL SPACE RECORDING DEVICES

Original Filed June 4, 1956 8 Sheets-Sheet 8

United States Patent Office 3,204,540
Patented Sept. 7, 1965

3,204,540

PROPORTIONAL SPACE RECORDING DEVICES

Robert T. Blakely, Poughkeepsie, N.Y., assignor to International Business Machines Corporation, New York, N.Y., a corporation of New York

Original application June 4, 1956, Ser. No. 589,107, now Patent No. 3,006,259, dated Oct. 31, 1961. Divided and this application Dec. 16, 1960, Ser. No. 80,719
1 Claim. (Cl. 95—4.5)

The invention relates in general to the use of a magnetic core matrix for column shifting or letter spacing control and more specifically to devices for recording xerographically with proportional spacing.

This application is a division of an application of R. T. Blakely, Serial No. 589,107, filed June 4, 1956, entitled "Proportional Space Recording Devices" now Patent No. 3,006,259, issued October 31, 1961. Another division of the same parent case has eventuated as Patent No. 3,134,090 issued on May 19, 1964.

An important object of the invention is to provide a high-speed recording device which has the additional advantage of recording with the improved appearance of character shapes having various widths and spaced proportionally to resemble book printing. Although illustrated as an improved form of typewriter controlled device, it is contemplated that it is to have more widespread use for recording in general, and especially in connection with data processing systems.

The invention is concerned with electronic controls for regulating xerographic recording with proportional spacing. Heretofore when a typewriter was adapted to control the impression of book-type print, it required an elaborate form of mechanical variable spacing means. One such example of "EXECUTIVE" style of typing device is that shown in the IBM Patent No. 2,547,449. In that instance the type shapes varied in width from what was termed two units to five units for the various shapes of characters. For example, the lower case l requires only two units of space, while the upper case W requires five units of space. The same relative proportions of character shapes are preserved in the present instance; however, in lieu of mechanism the present construction involves the use of an opaque tape whereon the characters are represented by translucent areas. An array of eighty arc lights or other rapidly operating illuminting sources are mounted in a line behind the rapidly moving tape. As illustrated, the characters are selected by an ordinary typewriter keyboard, but it is understood that such selection could be by means of cards, tapes, magnetic drums or disks or any other input control.

This device could be used with a record controlled reader to "print" complete book size pages by simply using a punched card or the like for each line of the page and having the card reader control the matrix cores.

By using this device it is also possible with a method of automatic feed to print each page of a book consecutively and when the last page is completed the book is ready for covers and binding without adding any further equipment to arrange the pages consecutively. It would only be necessary to type or read in from a card reader the first copy of each page and all subsequent copies would be made from this first copy. This method would eliminate time consuming and costly setting up methods used in conventional printing presses.

A device such as this would also be very useful in the drawing of circuit diagrams with either logical circuitry or schematic circuitry being "printed" photographically from block diagrams and components represented on the film tape.

When a key is depressed to select a particular character, it is required that not only should one of the eighty light sources be selected according to the previous extent of recording in a line, but also that there should be a differential selection of the particular time interval to integrate the particular character shape in the proper position on the record material. In other words, it is required that the character be selected with regard to a relatively wide time interval so as to coordinate it in word and sentence structure, but there is also need to select a particular fine degree of timing to assemble it in that word structure with the proportional spacing calibrated to agree with the differential spacing of the letters before it, and the particular width of the character itself. This last-mentioned feature of selection of coarse and fine degrees of timing are performed by electric controls involving the use of a magnetic core selective shifting unit and a number of electronic counters to store the column-by-column positions and also store the proportional space unit measurements.

The use of a magnetic core matrix assembly for character selection and spacing control is believed to have wider implications and uses extending into the field of automation in general. This is especially true in combination with the provided electronic counting controls for producing what in effect may be regarded as a vernier adjustment within the column-shift adjustment. In the present instance the magnetic core matrix selects a differentially spaced light source, and then the proportional space counter in cooperation therewith regulates the timing to one of five different instants so that the selected light has an effect on the moving tape with respect to coarse and fine timing selection. This sort of timing is believed applicable to many machine controls other than that of xerographic recording.

Another object of the invention is the provision of a xerographic recorder with electronic controls for proportional spacing of recording. In departing from the use of mechanism for proportional spacing, the present devices have the advantages of high speed and quieter operation.

Another object of the invention is the provision of controls associated with a magnetic core matrix to adapt it for letter spacing or column-by column shift control. In the present instance, the association of a stepping counter with one set of lines of the matrix is coordinated with a character representing array of cores associated with another set of lines; there being a third set of lines controlled by an emitter to read out any particular character at any particular instant for joint control of character selection and column selection.

Another object of the invention is the provision of an electronic proportional spacing counter fot maintaining a spatial account of character width recordings wherein the characters are of different widths and recorded in sequence to resemble book-type printing. Another object of the invention is the provision of photoelectric proportional spacing controls cooperating with register markings on a master tape for controlling the proportional spacing of recording from the character representations on the same tape. The photoelectric space selection controls are arranged in a set for selection of various spacing under control of the aforementioned proportional space counter.

Another object of the invention is the provision of electronic controls arranged between the magnetic core matrix and the array of arc lights whereby a gating arrangement is provided to select more than one light when a spacing arrangement requires the recording of a letter in an intermediate position. A series of eighty lights are arranged along the path of the master tape and said lights are evenly spaced to agree with the usual recording positions of characters of average width. The proportional spacing counter plays a part in the gating arrangement because the counter adjustment indicates when a character is to be recorded from an intermediate position between two lights.

Another object of the invention is the provision of a blocking device for influencing the operation of the basic counter which ordinarily steps along sequentially over the lines of the magnetic core matrix to letter space recording. It is the proportional space counter which activates the blocking control and it is so operated when the counter determines that enough space has been saved to warrant prevention of space progression of the columnshift controls.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 is a schematic perspective view of the entire proportional recording system.

FIGS. 2–5 when assembled in the arrangement

| | |
|---|---|
| 2 | 3 |
| 4 | 5 |

represent a wiring diagram of the electrical and electronic controls of the system.

Figure 8:
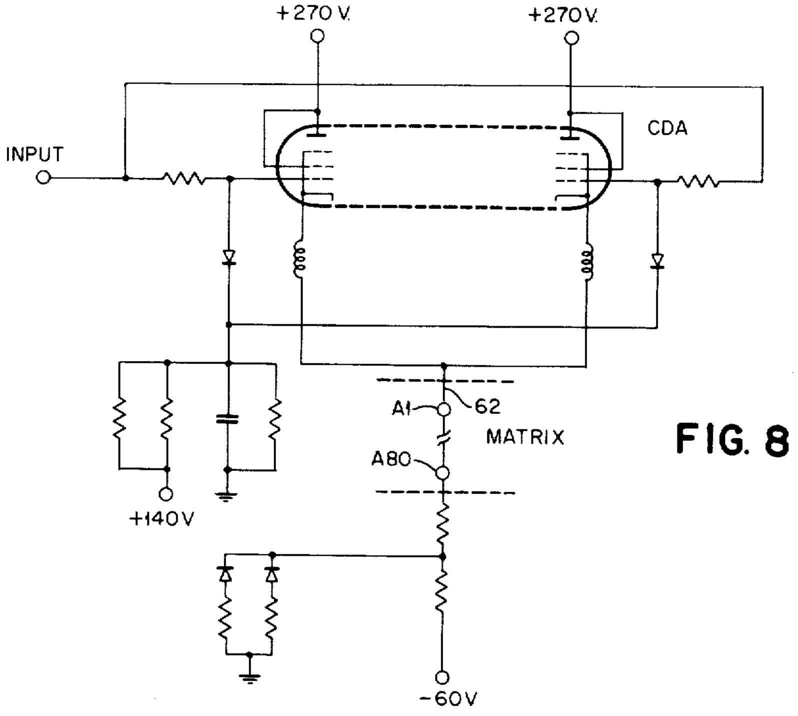

FIG. 8 reveals the circuit of a read-in current driver for the magnetic cores.

Figure 9:
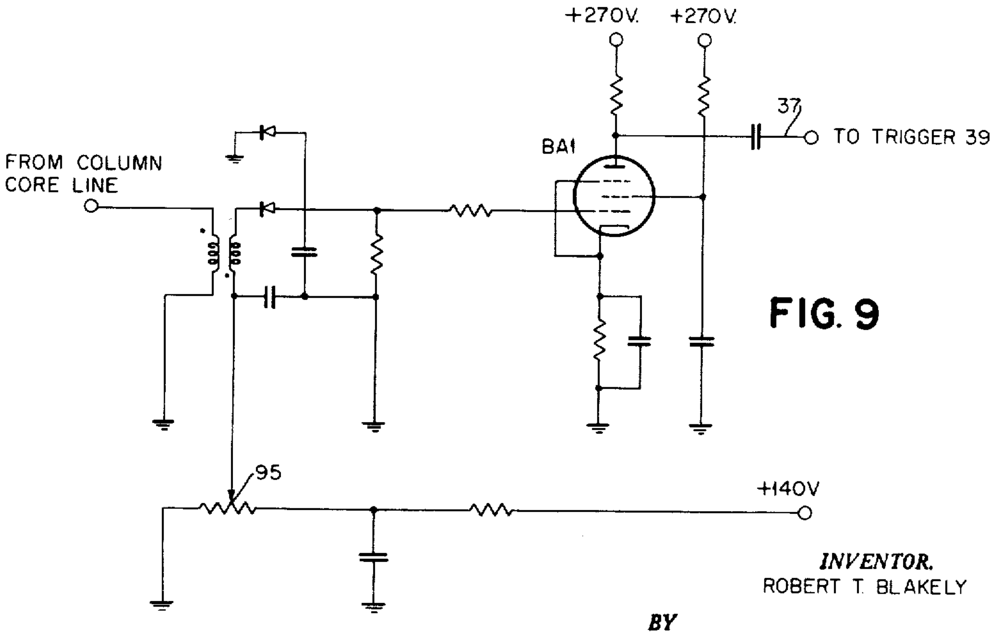

FIG. 9 shows the circuit for a buffer amplifier between the core readout lines and the trigger for the arc light recording controls.

Figure 10:
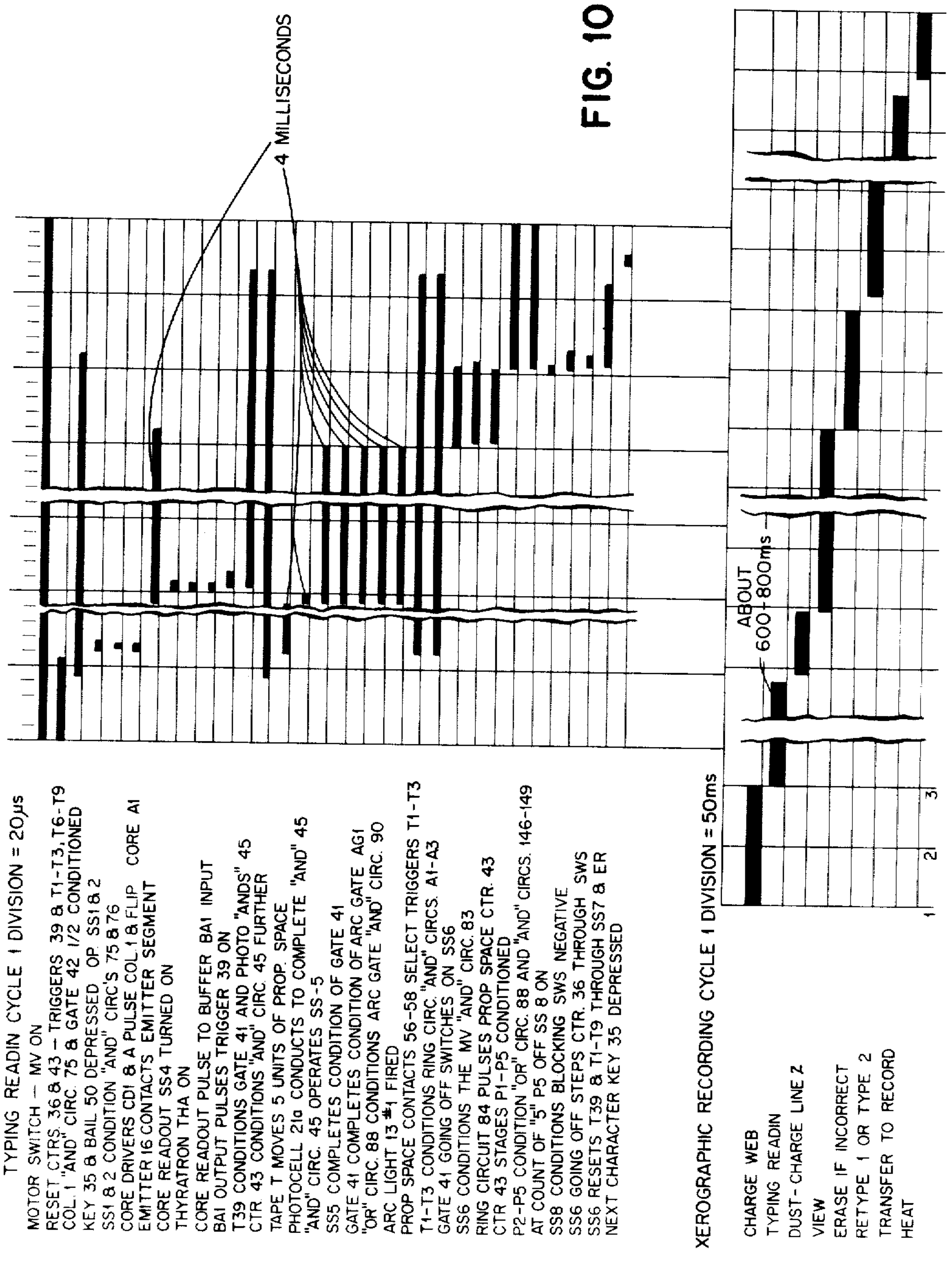

FIG. 10 is a timing chart showing the sequence of operation of the recording and resetting controls.

Figure 1:
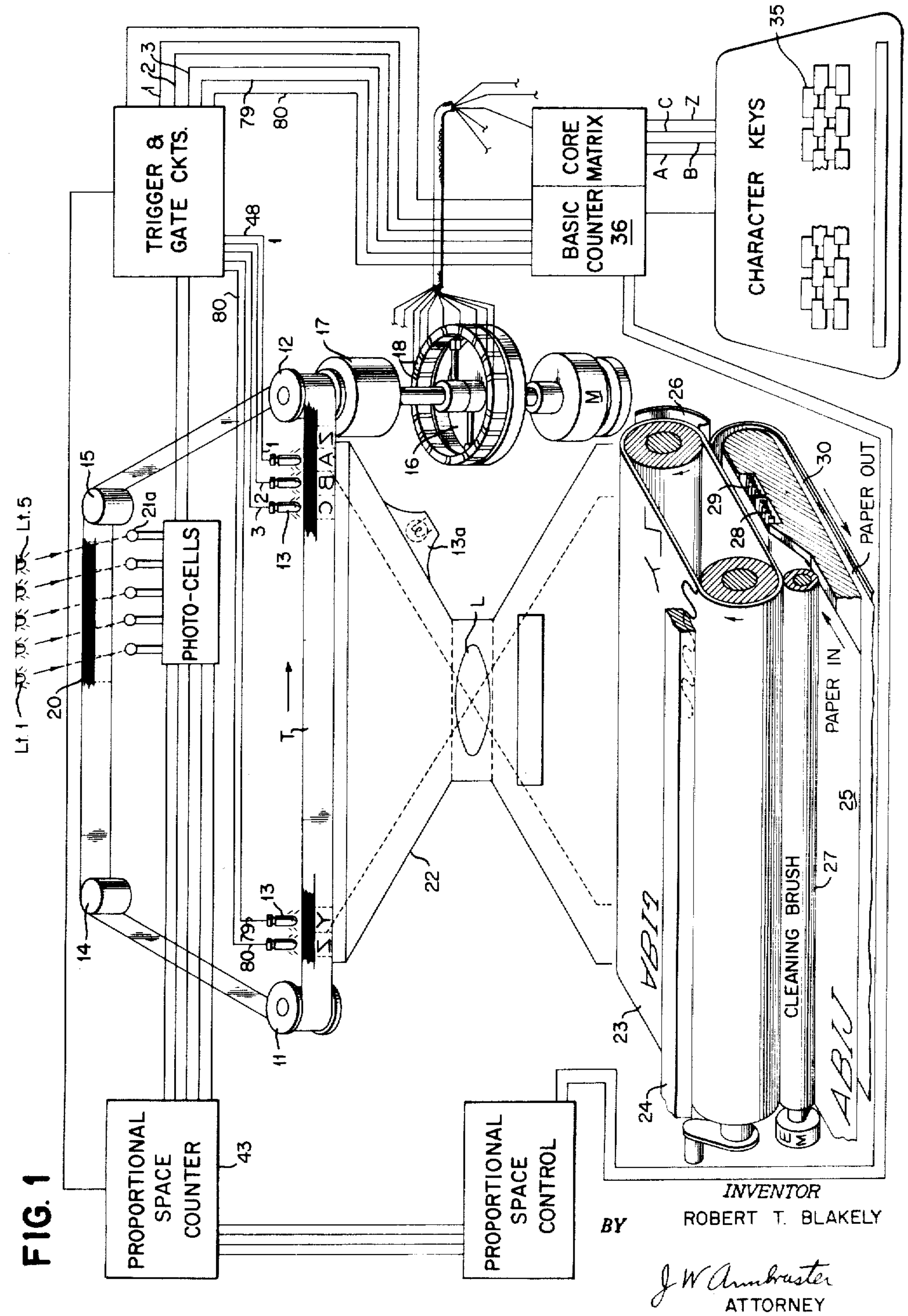

The character bearing master tape T, FIG. 1, is seen to be a transparent film or band which is drawn around four pulleys, the two large ones 11 and 12 in front and a smaller pair 14 and 15 in the rear. Motor M drives the shaft for the pulley 12 at a rapid rate and produces a clockwise motion of the tape in front of the eighty arc lights 13. As shown by the letter Z, the tape is a translucent retainer with the letter shape as an opaque area. The other letters, numbers, characters or signs are arranged in regularly spaced progression along the tape and repeated four or more times so that for each revolution of a commutator or emitter 16 any letter may be recorded. A gear box 17 holds gearing to synchronize the motion of the tape with the contact of the segments 18 of emitter 16. Arranged around the top of the tape is a regular progression of proportional spacing controls in the form of five small circular translucent openings 20 arranged diagonally above each letter and in an opaque background. These openings 20 (see also top of FIG. 2) are coordinated with the photocell sensing devices 21*a*–21*e* which have light sources focused respectively at five, four, three, two and one intervals away from each small translucent area so that a fine degree of proportional spacing may be selected by closing a circuit in series with any one of the five photocells 21*a*–21*e*.

Regarding the device generally, it may be noted that the light from the sources 13 is directed through a hood or light proof enclosure 22 and through a lens L before striking the charged photoconductive xerographic web 23. On the left of this web 23, there is shown as an example the assembly of the four characters A, B, I and J, the first two each occupying four units of space, the I requiring two units of space and the J having three units of width. It is an object of this invention to so assemble the selected letters and place them on the record with the proper proportional spacing.

The method of recording, developing, and the reproduction of multiple printed copies is along the lines of the process of Xerographic printing as set forth in patent application Serial No. 401,463, filed on December 31, 1953, by R. W. Lowrie, now Patent No. 2,803,177. Briefly, this process is as follows:

(1) The first step in the process is the charging of a thin layer of the photosensitive web 23 by electrostatic induction with a static D.C. voltage in the order of 3,000 volts. The photosensitive film can be selenium evaporated onto the foil aluminum base web in a layer .002 of an inch in thickness.

(2) Shielding the photosensitive web with a light pervious control sheet carrying opaque images to be recorded. In the present instance the control sheet is the tape T with the letter images.

(3) Exposing the combination to a light source that is directed through the shield to the photosensitive web whereby all the areas of the film not covered by opaque images will lose their positive charges.

(4) Dusting the web with carbon or other powder toner so that the toner will adhere to the charged portions.

(5) Transferral of the carbon image to paper through the application of an electrostatic field or other methods.

(6) Heating to fuse the powder into the paper to prevent smudging and to give good permanent, high quality dense black areas. FIGURE 1 shows the method of incorporating these steps in the present device.

In this recording device the essence of the above process will be retained, but will be incorporated in the following manner:

(1) With a basic letter spacing counter reset to the home or "1" position, the charging electrode, grid 24, conditions the first line to charge the photosensitive web 23 prior to typing of the first line and it does this by electrostatic induction so that the coating is charged positively. This charging electrode or grid 24 extends across the entire width of the mechanism so that it may cover and prepare the whole line.

(2) The operation of typewriter keys will direct light through tape T and produce areas of light around the opaque character shapes on the photosensitive coating, and wherever the light strikes, the positive charges disappear. When line 1 is completed and the basic counter restores from letter space position 80 to position 1, the typewriter mechanism automatically steps the endless web 23 of photosensitive material and the record sheet 25 to the next line.

(3) Upon arrival at the next line, line 1 is now exposed and ready for dusting. At the time the photosensitive web 23 is being positioned to type the second line, the grid electrode 24 is set into operation, charging the second line area of photosensitive coating on web 23 and dusting the exposed first line in a carbon dust chamber 26 wherein the dust is lifted by belt and cascaded over the positive charge areas as aided by the application of a voltage on another grid spaced beyond the charging grid 24.

(4) At the conclusion of the dusting operation, a viewing light may be turned on to reveal the first line to be inspected by the operator. If an error is seen by the operator, an erase button may be depressed and a motor EM activated to rotate a brush 27 and wipe the powder particles off the entire line to effect a line erasure. A suction removal unit may be provided to carry off the loosened dust. The operator must now manually turn the photosensitive web 23 drums and the paper feed back one line to retype the first line. For ordinary continuous copy operation, the brush 27 is in continuous operation to prepare the web surface for regularly spaced charging operations.

(5) If the first line was correct, or has been corrected, subsequent lines are typed and they all eventually pass the transferral station 28 at which the dust shapes in each line are transferred by electrostatic induction from the web film 23 to the paper 25. The positively charged paper attracts the carbon dust from the web to form a direct positive image on the record sheet.

(6) After a line passes the transferral station 28, it travels through a heating chamber 29 which permanently fixes the carbon onto the paper.

(7) When a page has been completed, it may be put into the top of the device and used as a master plate in cooperation with a reflective light source 13*a* and the same optical system to regenerate the photosensitive web for other successive copies.

The record sheet 25 is advanced along the U-shaped channel 30, going in at the top and coming out through the lower opening of the channel. Although the line of characters ABIJ are shown at the bottom of sheet 25 for ease of illustration, it is understood that the first line of print is usually at the forward end of the sheet.

An important advantage of this method of Xerographic printing is that the second projecting system can be used to project any printed or pictured matter onto the photosensitive web, which matter is reproduced xerographically onto the ordinary paper used in the machine. The device is, therefore, very useful both in originating typewritten material and for copying any material easily and rapidly.

Consideration may be given now to the electronic deivces which are controlled by the typewriter keyboard for properly assembling letters of varying width with proportional spacing across the recording web 23.

Figure 2:
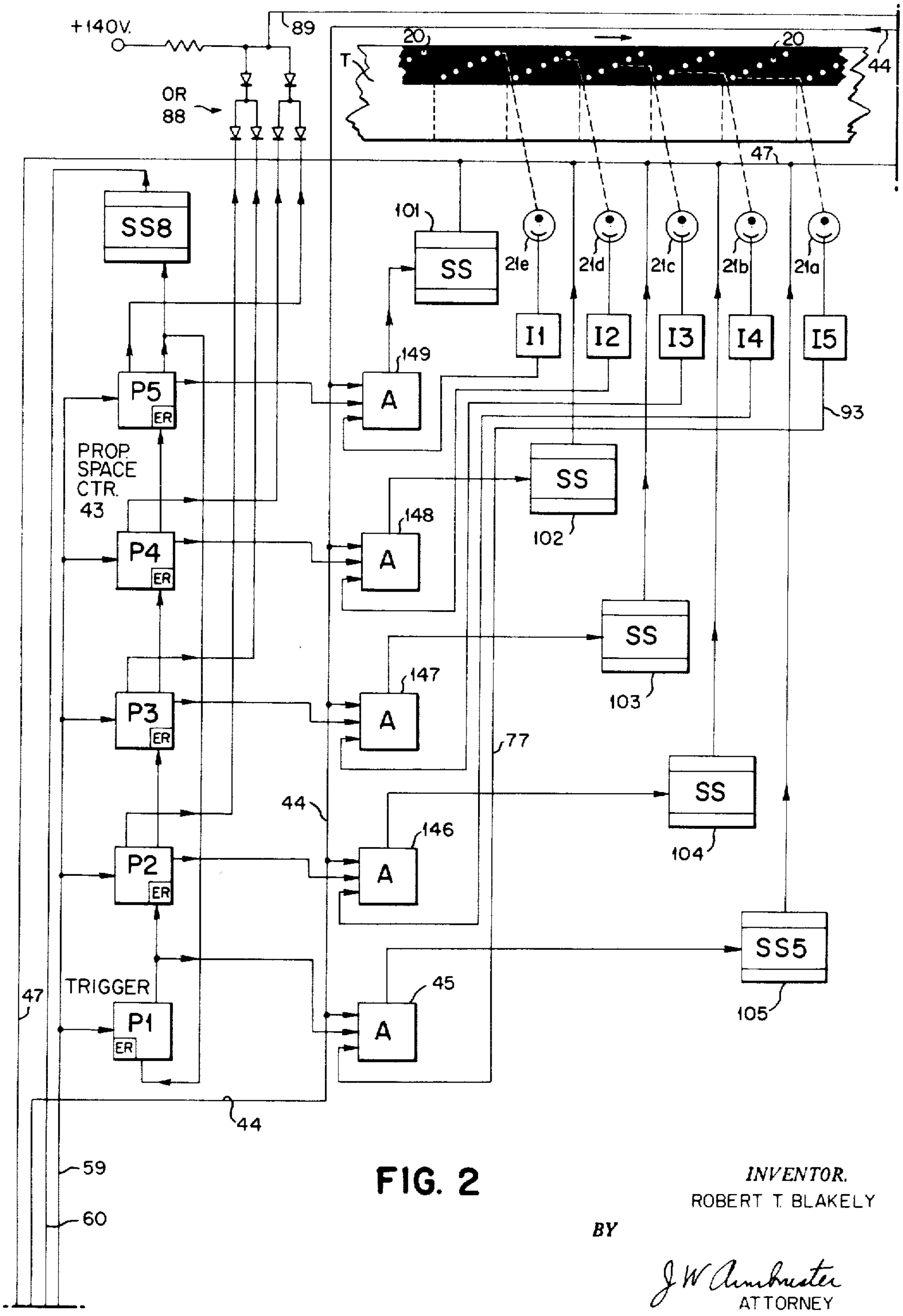
Figures 3, 3A:
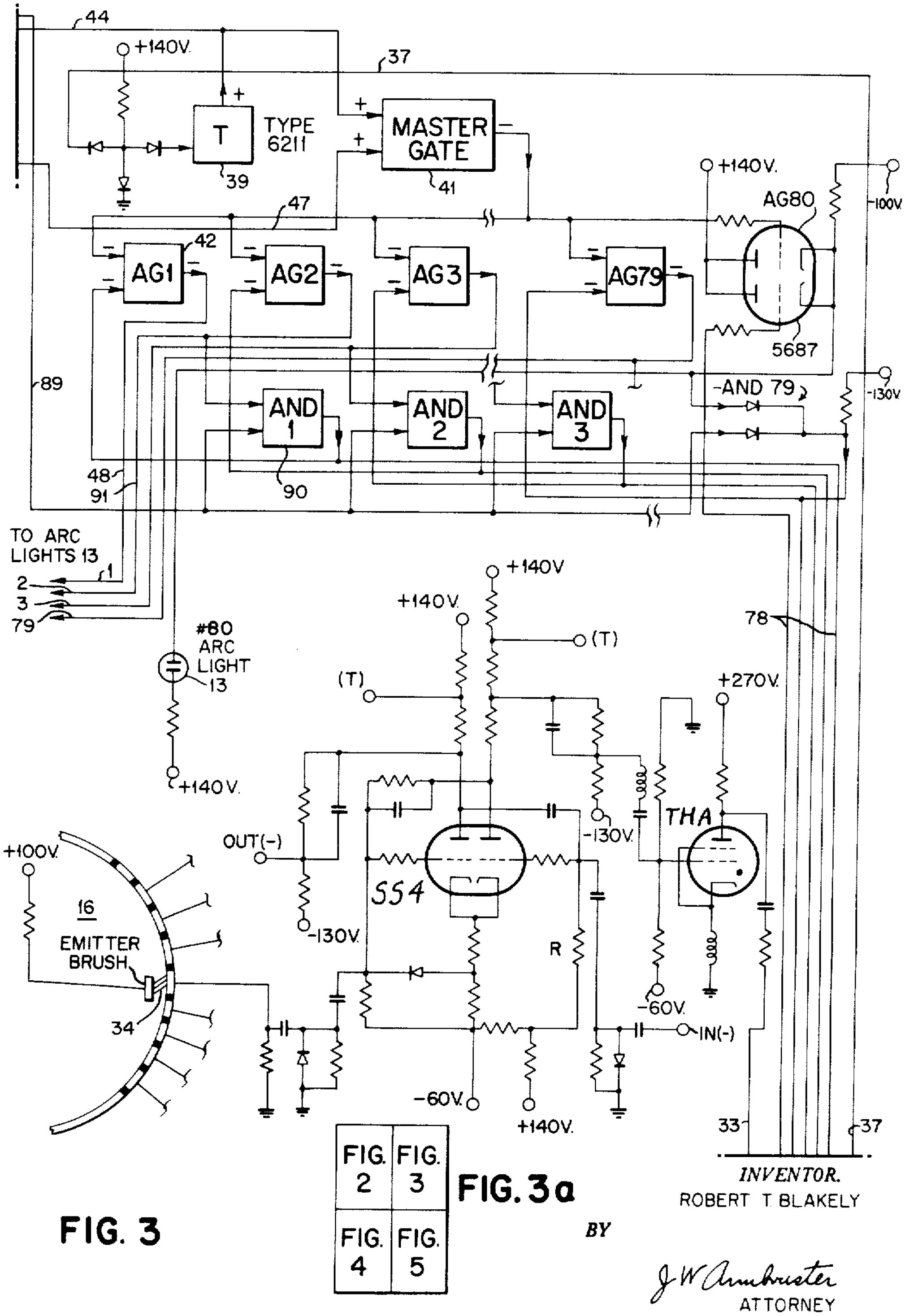
Figure 5:
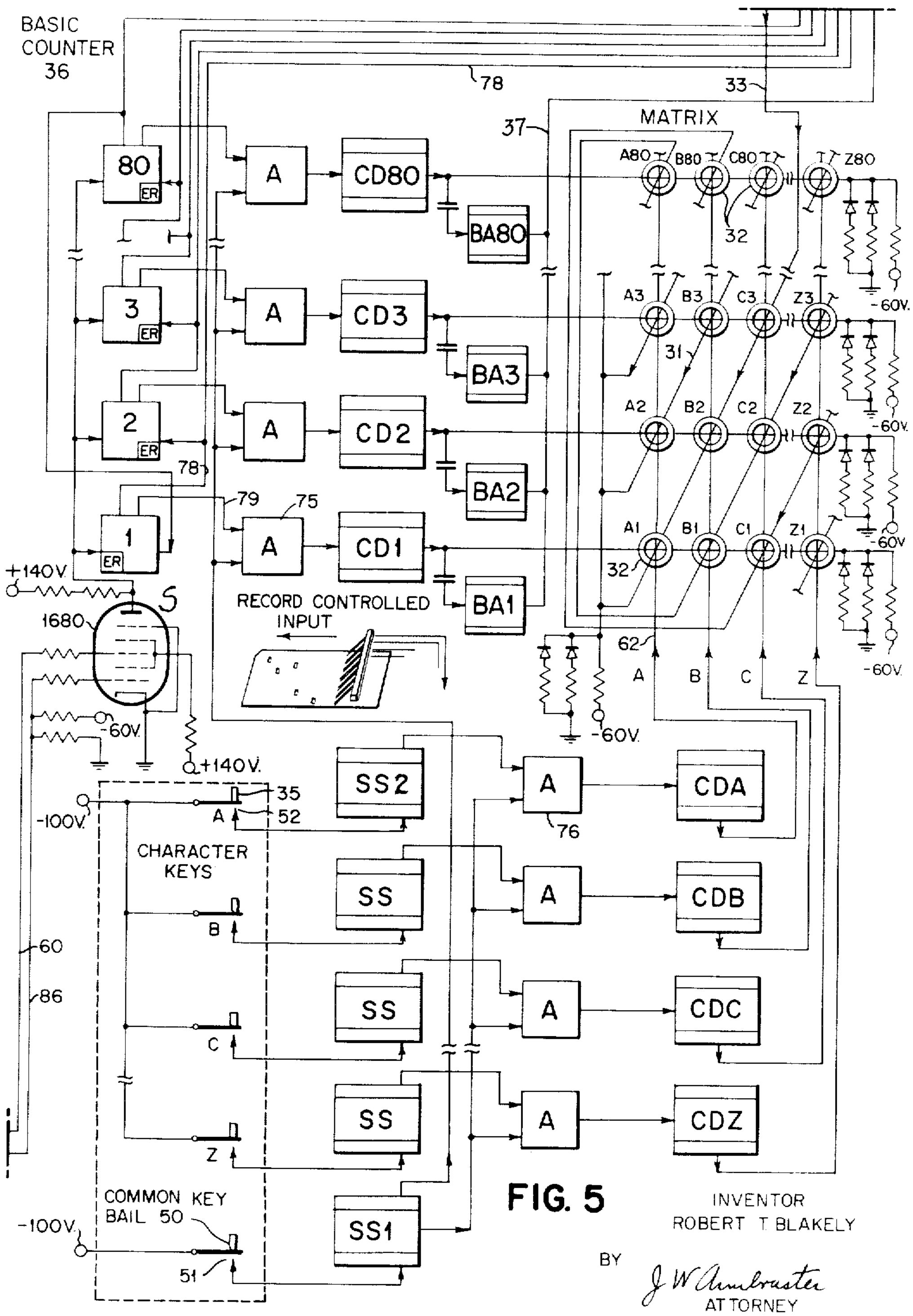

The magnetic core matrix is shown at the right in FIG. 5, and there it is seen to have the proportion of twenty-six vertical lines of cores 32 arranged in eighty horizontal lines. This is only by way of example as it will be realized that alphabet recording alone is not ample for all purposes and additional vertical lines may be required for numerals and special characters. However, the illustrative showing is clear that for each letter or character there is a memory element or core 32 provided in association with every one of the eighty-column spaces as shown by the eighty arc lights 13, FIG. 1, across the tape T and a similar width of sheet 25 on which any of the alphabet characters may appear in any of the eighty possible letter space (column) positions across a horizontal line. The diagonal lines of the matrix are seen to be connected to the emitter 16 which is aligned with the drive for the shaft carrying the pulley 12. The diameter of the emitter 16 and the spacing of the contact segments 18 thereon are arranged to synchronize with the appearance of the letter shapes before the eighty light sources 13. In other words, taking the diagonal line 33, FIG. 5, for example, it is noted that the A1 core 32 is at the intersection of the number "1" horizontal line and the vertical "A" selecting line. The B2 core is at the intersection of the "2" line and the "B" line, etc. When this diagonal line 33, FIG. 3, is made effective by the brush 34 of the emitter 16, then the tape T, FIG. 1, is so situated that the A shape is near the #1 light source 13, the B shape is near the #2 light source 13, etc. Since there is a core for each letter in each position, it is possible by changing the status of any particular core and then reading all of them sequentially to select the position in which the selected letter is to be recorded across the horizontal line of the photosensitive web 23. A particular core is selected and flipped by the coordinated operation of a character selecting key 35, FIG. 5, on the keyboard, and the sequential selection of a certain progressive stage in the basic counter 36. Since the counter 36 starts restored to the "1" position, and if we are to assume that the A key 35 is the first operated, then the A1 core 32 at the lower left matrix position would be the one activated by joint concurrent half-magnitude energizations through the horizontal "1" line and the vertical A line. Then, since the A character is in primary recording position on the tape, the emitter brush 34, FIG. 3, is also in position to select the diagonal line 33. Under such conditions, a pulse is then sent up line 37 and over to the main trigger 39 and then over to the master gate 41 and the photocell "And" circuits, but this pulse is not immediately effective to completely condition the "1" gate 42. The timing must await the proportional spacing controls selected by the photocells 21*a*–21*e*, FIG. 2. Since the proportional space counter 43 is always restored to the "1" position at the beginning, it is this stage of the five-stage counter 43 which is effective at the beginning wherein we are assuming the selection of the character A. An "And" circuit 45 which has already been conditioned through line 44 by "ON" status of trigger 39 and the first stage of the proportional space counter will now give an output pulse only when the fifth photocell 21*a* receives light. The fifth photocell is in cooperation with a light source L*t*5, FIG. 1, directed at a point five units of spacing advanced from the lowermost one of the translucent spots 20 which allows the tape T to move five units of space in a clockwise direction and thereby bring the A tape image over in front of the No. 1 light source 13 to align it at the very first position before the "And" circuit 45, FIG. 2, turns on a single shot SS5 which through line 47 influences the final conditioning of the master gate 41, FIG. 3, to activate the final AG1 gate 42 in the first position so that through the line 48, FIG. 1, the first light source 13 is flashed to record the A as shown on the recording web 23.

The character keys operate a common key bail 50, FIG. 5. Underneath this bail is a set of contacts 51 which are operated upon depression of any character key.

The depression of any character key 35 results also in individual contact closures as at 52, causing a stepping operation of the basic counter 36, and when this is pulsed, it proceeds to select progressively one of the eighty horizontal core matrix lines, except when blocked by the switch S because of the saving of a proportional spacing accumulation of five unit spaces or one full letter space which is also the equivalent of one step along the line of eighty arc lights 13, FIG. 1.

Figure 4:
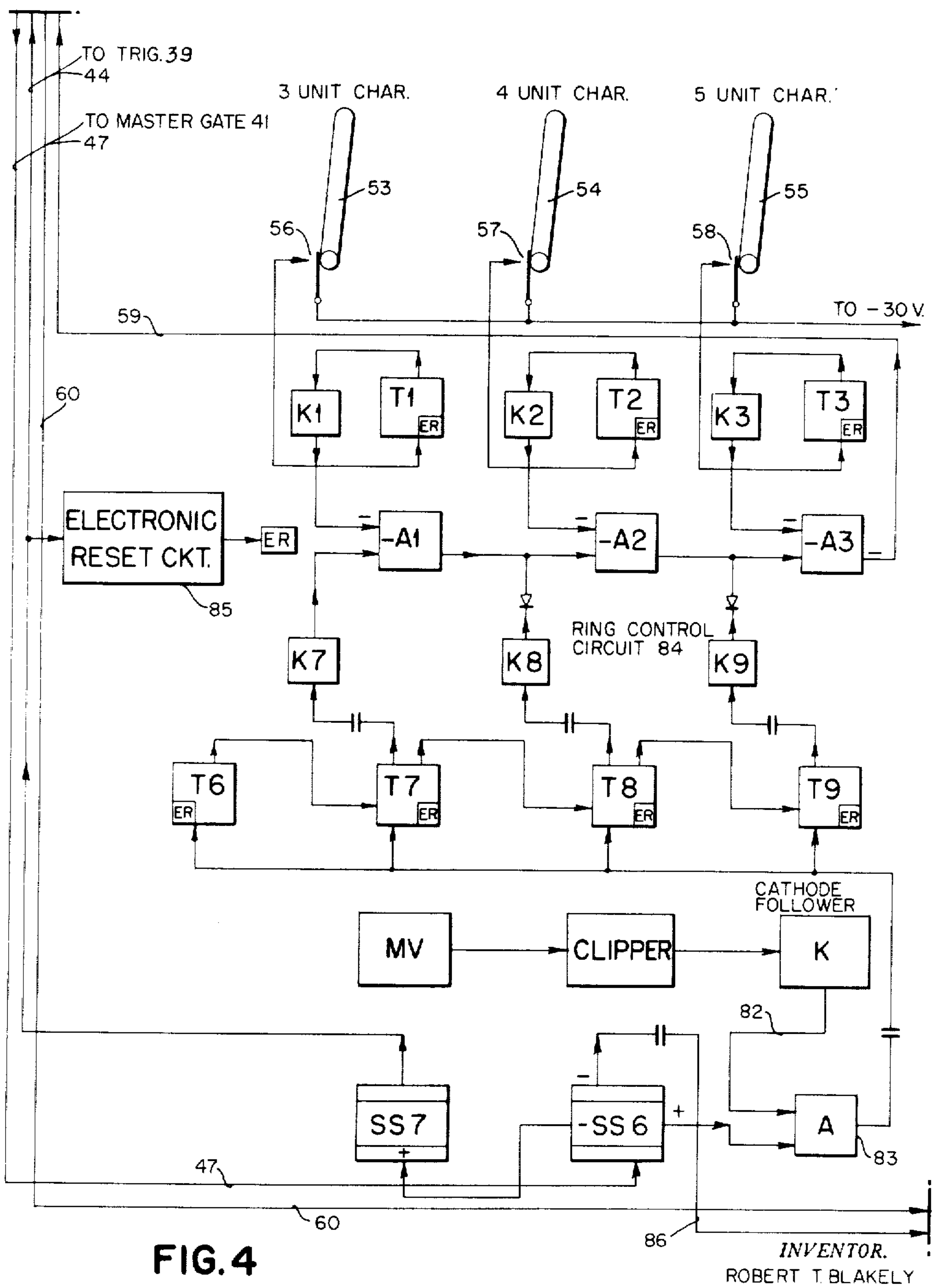

Depression of a character key also mechanically controls movement of bails 53, 54 and 55, FIG. 4, mounted on a shifting frame which is found fully explained in the Dodge Patent No. 2,547,449. According to the width of the character selected, movement of bails 53, 54 and 55 operate spacing control contacts 56, 57 or 58 to set up proportional spacing controls. The character width is stored in triggers T1–T3 of the proportional space control circuit until after the selected character has been recorded; its width can then effect stepping of the proportional space counter 43, FIG. 2. Operation of a key having a character of three units of width causes movement of the bail 53, FIG. 4, and closure of contacts 56. In a similar fashion, bails 54 and 55 are operated along with selection of characters of four and five units of width respectively. For a selection of a character of a width of five units, there is a closure of contacts 58 and operation of a negative "AND" circuit A3 so that no pulse output can pass to step the proportional space counter 43. For a selection of a character of a width of four units, there is closure of contacts 57 and a single pulse is allowed to pass through the circuit as a complement of the value five; i.e., the basic value five minus four units of widths equals unity. For a character of a width of three units, there is allowed to pass (five minus three) or two pulses. For a character of a width of two units, there is allowed to pass (five minus two) or three pulses. These pulses of a selected number are carried along the wire 59 and directed into the progressive stages of the five-stage proportional space counter 43. There a certain stage is put in the "on" condition in readiness for the selection of the proper photocell 21*a*–21*e* as an accompaniment of the next recording cycle. This proportional space counter 43 performs another function in selecting the proper arc light source 13 by blocking the stepping of the basic counter 36 whenever there is a saving of five units of width, equivalent to a full basic letter space. In order to perform the last-mentioned control, the proportional space counter 43, FIG. 2, is provided with an extra stage of electronic carry control in the form of a single shot SS8 which is brought into operation when the counter 43 goes from five to one, and this control is carried down wire 60 and over to the switch S, FIG. 5, leading into the basic counter 36, and there a blocking action is effective for one cycle of operation to prevent the advance of arc light progression and selection when a saving of one basic letter space has been effected.

The magnetic core shift controls are shown mainly in FIGURE 5. The purpose of this unit is to select the tape character and control the basic or coarse interval of time at which a certain light is flashed thereon. The inputs to the matrix are shown to be from the bottom and left sides, i.e., from the character key lines and the horizontal shift lines which come out of the basic counter 36. An example may be taken assuming that the first recording is being made and that the A key is depressed, then the A shift line 62 will be energized and control exercised to flip the core in the lower left-hand corner of the matrix. During a readout from the matrix unit, the emitter 16, FIG. 3, which is synchronized with the character tape T will come into play along the diagonal line 33, FIG. 5, and flip the A core back to normal, giving an output pulse on the #1 horizontal line. For the next entry, if the character A is again selected, the basic counter 36 would then be standing effective in the second position and the shift line #2 would be energized. This would flip the core A2, and the subsequent output would be derived from connection by the emitter to the diagonal line 31 and occur at a time coincident with the appearance of the letter A on the tape in front of the second light source 13 to record the second A adjacent to the first.

In order to illustrate the mode of operation, a number of letters are shown recorded on the sheet 25 and these letters are assumed to have various widths. The A is assumed to have a width of four units, the B four units, the I two units and the J three units.

Figure 6:
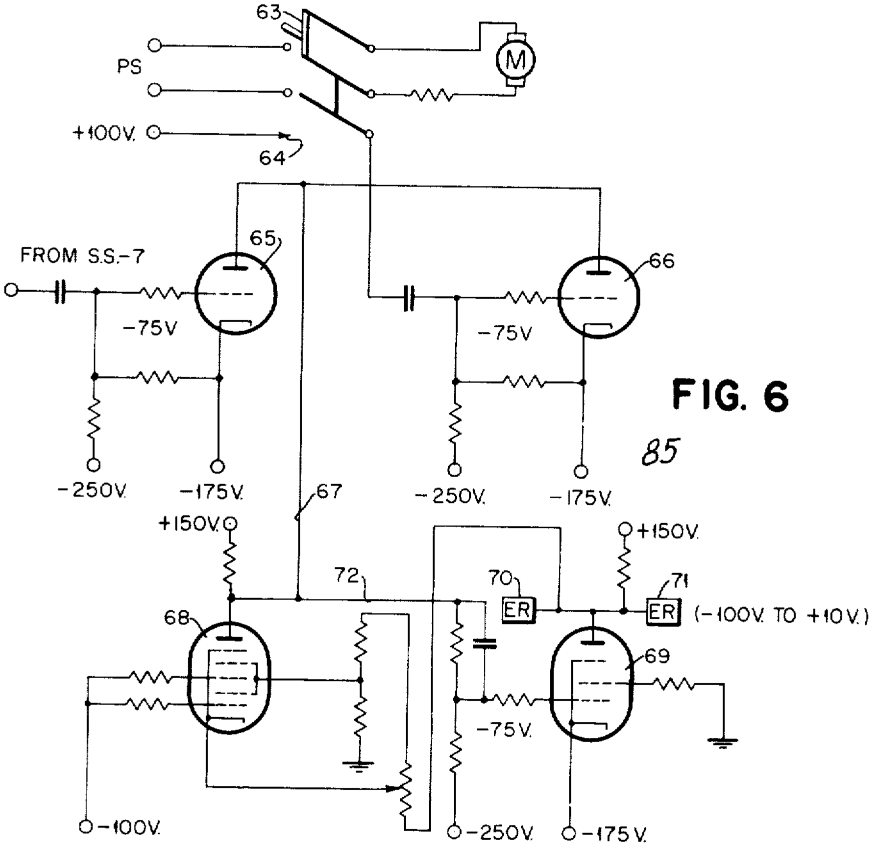
FIG. 6 shows the electronic reset circuit.

The first step of operation is to close the power switch 63, FIG. 6, for the motor M. Since it is also required that the counters be restored to a home position, this is accomplished by closure of other contacts 64 by the same motor switch 63. As shown here, the motor switch closes contatcs 64 for operating to restore the basic counter 36 and the proportional space counter 43 to the "1" position and to insure the conditioning "OFF" of trigger 39 and the proportional space control triggers T1–T9. Referring to the electronic reset controls shown in FIG. 6 it is seen that upon operation of switch contacts 64 or the SS7 for end of recording, one or the other of the tubes 65 or 66 are made conductive and thus lower the potential of line 67 to effect resetting by tube 69 as explained more fully hereinafter.

Assuming that the first character to be recorded is the "A," it will be recalled that this character is four units in width. Since the "A" character cores must be pulsed at the same time as the pulsing of the column 1 cores in order that core A1 may be energized to shift its status, it is necessary that the column and character "And" circuits 75 and 76 be simultaneously conditioned. Depression of the character "A" key closes contacts 52, turning on single shot SS2 which for a given time interval conditions half of the "And" circuit 75 for the "A" character cores, and simultaneously operates a common key bail 50 to close contacts 51 turning on single-shot SS1 (for the same given time interval as SS–2) to condition the other half of the "A" character "And" circuit 76 and one-half of the column "And" circuit 75. Since the other half of the column "1" "And" circuit 75 was already conditioned by the basic counter 36 being reset to the home or "1" position, there is obtained a current pulse in the column "1" cores from the readin current driver, CD1, at the same time that there is received a current pulse in the character "A" cores from another readin current driver CDA conditioned on by the "And" circuit 76 of the "A" cores. The combined or doubled value of current at the junction of the "A" character line and the column "1" line is sufficient to change the status of the A1 core at said junction at the lower left of the matrix. Then at a time that the character A on the character tape T, FIG. 1, is slightly to the right and in front of the extreme right-hand or #1 light source 13, the emitter 16, FIG. 3, will contact the particular segment perfecting a core readout circuit which will turn on single-shot SS4 which in turn effects a readout pulse in diagonal shift line 33 through a readout thyratron THA. This causes a current to be passed in core A1, FIG. 5, in the opposite direction to that previously applied by the first A line and the column #1 line. This will restore the A1 core to its original status and place a pulse on the column #1 line which is detected and amplified by a buffer amplifier BA1 and carried through wire 37, FIG. 3, to shift trigger 39 to the "ON" status. The "ON" status of trigger 39 in turn conditions one-half of master gate 41 and through wire 44 it also conditions one-third of each photocell "And" circuit 45 FIG. 2. Thus, the gate 41 is prepared for the secondary control which is influenced by the proportional spacing values as sensed by the photocells **21*a*–21*e*. At this point it is well to mention that the character shapes on the control tape T, FIG. 1, are arranged with their formation to the extreme right of the block of space allotted for each type form on the tape. This means that out of the five units of interior division of the block space the character will occupy those at the right in preferance to those at the left. An example of this may be explained with reference to some of the characters shown as projected onto the photosensitive web 23 and of such characters the A, I and J occupy respectively the first four, the first two and the first three units of spacing at the right of the respective tape blocks. With the character shapes so arranged, it will be realized that the first character to be recorded on each record line must have an additional movement of five tape space units after the initial selection by the emitter, and this is always so because the proportional space counter 43 starts at "1," FIG. 2, and through wire 77 this first stage is receptive to "AND" control by the long delay photocell 21*a*, and this photocell is positioned with respect to the lowermost area 20** and its related light source *Lt*5, FIG. 1, so that the tape T must move five units of space to the right at the rear, and accordingly five units of space across the front of the #1 light source 13 at the front, so that in the present instance, the "A" will in this fashion be recorded with its left side at the very start of the recording line on the record web 23 as shown in the drawing.

This fine degree of timing, involving the primary selection of the #1 light source 13 followed by a proportional spacing delay to allow five units of movement, is accomplished by the action of the master gate 41 which is first conditioned through the emitter and diagonal core line control and finally caused to allow passage of a pulse to the #1 light source 13 because of the secondary action through the wire 47, FIG. 2, coming out of the photocell control "And" circuits such as circuit 45. Since the proportional space counter 43 is in the home or "1" position, one-third of the photocell **21*a* "And" circuit 45 is therefore conditioned, and after trigger 39 through wire 44 conditions the second-third of the same "And" circuit, this circuit will be completely conditioned when light strikes the photocell 21*a* through opening 20 causing it to turn on an inverter T5 the output of which performs the final third part of the conditioning. The conditioning of the photocell 21*a* "And" circuit 45 turns on SS–5 which for a given time interval conditions the other half of master gate 41 causing it to condition one-half of the eighty gates AG1–AG80 which inturn are connected to the respective light sources 13**.

The progression of effectiveness of the gates AG1–AG80 is provided through the basic counter 36, FIG. 5, and a series of eighty lines 78 extending in parallel with the related counter output lines 79 which go to the core driving circuits. It is through the joint action of a line 78, FIG. 3, of a certain basic counter stage with overall action of the master gate 41 that one of the subordinate gates AG1 is made effective through a wire 48 to select the momentary flashing of the particular first light 13.

After this first recording, the positive pulse resulting as the master gate 41 goes off, courses through line 47, FIGS. 2 and 4, and turns on a single-shot SS6, FIG. 4, which makes the output of a multivibrator driven pulse-shaping circuit 82 effective through an "And" circuit 83 to initiate a series of pulses from a one cycle ring circuit 84 to the proportional space counter 43. Since the "A" character was of 4 units width, bail 54 operated contacts 57 turning on trigger T2 which stored the character width. This one cycle ring circuit 84 will now give one single pulse output due to the "on" status of trigger T2 and direct it through wire 59 and into the proportional space counter 43 to bring it to "2." After sufficient time has transpired to allow stepping of the proportional space counter 43, single shot SS6 turns off and in doing so yields an output pulse through wire 86, FIG. 5, which is used to step the basic counter 36 one step through a switch circuit S to bring it to "2." This output of SS6 also serves to turn on SS7 which activates electronic reset circuits 85, FIG. 6, to reset trigger 39, the one cycle ring circuit triggers T6–T9, and the width storing trigger T2.

It may be assumed that the next character to be recorded is the letter B which is also proportioned with four units of width. When the B key is depressed with the basic counter standing at 2, the B2 care will be energized to change its status. At the same time, the character B on the tape T is approaching towards the front of the second light source 13 and a circuit will be completed from the emitter shift line 33 to restore the B2 core to the normal status and place an output pulse on the second buffer amplifier BA2 and line 37 to shift the trigger 39 and condition the master gate 41 at the proper time. With the proportional space counter 43 standing at "2," the photocell inverter I4 will be conditioned to be receptive when the fourth timing control tape opening 20 is aligned with the photocell **21*b*. The circuit through the lines 44 and 47 will be activated to condition the second control of the master gate 41 when the character B has moved four additional units of space. With the basic space counter 36 standing at 2, the gate AG2 controlling the second light source 13 will then be completely conditioned and the second light source will be flashed. At the same time, the first light source 13 will be flashed along with the second because the tape portion with character B extends partly into the area controlled by the light from the first source. This selective control of more than one light source and a sort of retrogression of light control is performed as follows: With the proportional space counter 43 standing at 2 (i.e., at any value other than 1), the "OR" circuit 88 will activate line 89 and condition all the "And" circuit gates 90 between the light sources. When a pulse is sent to the second light source 13 over wire 91, it will also pass through the accompanying "And" circuit gate 90 and through a wire 78 carry the control through the first gate AG1 and the first light source 13 and flash it along with the second light 13. This is required because it will be noted on the recording web 23 that at the time B is to be recorded, it is one unit over in the first area and part way between the first and second light sources and so they are both flashed for recording purposes. After recording, an entry is made in the proportional space counter 43 to bring it to 3, and the basic space counter 36** is also advanced to 3.

It is assumed that the next character to be recorded is the letter I, which is two units in width. Since the basic counter 36 is conditioned to hold a "3" as pointed out, the I3 core (not shown) will be changed to the storage status and, during the subsequent emitter operation, a pulse will be placed in the third buffer amplifier BA3 output line as the I character on the tape approaches the third light source 13. However, with the proportional space counter 43 also standing at 3, the third photocell stage I3 will be conditioned and when the I is in the correct recording position, the third tape spacing control open 20 will be opposite the photocell **21*c* and cause proportional spaced recording as shown on the photosensitive web 23. Because of the operation of the connecting gate stage "AND 2" between the second and the third gate AG3, the second light source is called in for illumination as well as the third light source. In this particular instance since the narrow I character is adapted to be squeezed in along side the previously recorded B character within the second assembly of five unit spaces on the web 23**, the second light source is the only one that is effective in connection with the tape T in this particular operation. By means of proper spacing of the characters on the tape and masking out of side illumination, it is possible to restrict recording to projection of one letter at a time.

After recording the I, an entry of three pulses is made into the proportional spacing counter 43 because the ring counter 84 is adapted by the selection of a two unit character to generate a pulse set which is the complement of five as influenced by the selection of a narrow character. This entry of three in the proportional space counter causes it to progress past five and back to the #1, or home position. When the proportional space counter is so operated, it calls into operation the extra stage device, single shot SS8, which is a form of carrying means and in this instance, the carrying effect is carried down through wire 60 and over into a blocking device, switch S, arranged in series with the input adding control 86 of the basic counter 36. By blocking the adding operation of the basic counter, the ususal stepping or sequential operation of the counter stage by stage is interrupted so that the stage which was "on" in the last operation remains on for the next operation.

With the proportional space counter 43 again at "1," the next character to be recorded will be placed so that its left edge is aligned squarely with the very beginning of the third letter space as shown on the record 25. In this particular instance it is assumed that the capital letter J is to be recorded next to the I. This letter J is assumed to be three units in width and illumination of the third light source 13 is carried on following the engagement of the emitter with a segment indicating the selection of the "J" portion of the tape T as coordinated with a readout pulse from the core intersected by the third diagonal line and then only after the passage of five subsequent intervals of time (related to 5 space units) because the "1" standing of the proportional space counter 43 is selective of the fifth photocell stage I5 which causes a delay of five units to control recording of the character J so that its left edge is carried all the way across the third letter spaced interval on the photosensitive web 23 before it is recorded.

The timing or sequence of operation of the various steps contributing to the recording operation is critical, and it is only after the recording cycle in which one letter shape has photoelectrically affected the recording web that the proportional space counter and the basic counter are advanced so that arrangements are made for the next recording operation.

In the instance involving the recording of the letter I, there was also a critical timing relationship because the I was selected on the core matrix in association with the third diagonal line and yet timing was required to advance to cause recording in connection with the second letter space and this was accomplished by the circuit shown at the top of FIG. 3 including the gates 42 and the "AND" circuits 90.

The specific core winding structure may be noted by observing that the two input windings are of a ratio $$\frac{N_1}{N_2}=1$$

The diagonal output winding is of ratio $$\frac{N_1}{N_3}=1, \frac{N_2}{N_3}=1$$

The respective directions of the three lines through each core are shown by the arrows in FIG. 5.

The specific construction of the several counters may be considered at this point.

As noted at the lower part of the drawing, FIG. 4, the ring counter 84 is composed of a series of type 6211 tubes each connected capacitively to the next stage. When the multivibrator driver MV is made effective, the first of three pulses is effective to turn off trigger T6, which in going off turns on trigger T7. The output pulse of trigger T7 going on yields an output pulse driven by cathode follower K7, through the —And circuits and wire 59 if a character width (i.e. 5, 4, or 3 as distinct from 2 unit width) has not been stored by either one of triggers T1, T2 or T3 which would condition one of the —And circuits A1–A3 to "off" and not allow it to pass. Similarly, the second pulse turns T7 off, turning T8 on giving an output pulse which is now only blocked by action of contacts 57 or 58 as controlled by 4 and 5 units width character storages in either trigger T2 or T3 serving to condition —And circuits A2 or A3 off. The third pulse turns 78 off and T9 on to emit a pulse controlled only by a 5 unit width of character selection evidenced by closure of contacts 58 and stored in T3 to condition —And circuit A3 off. Thus, A3 eliminates all pulses, A2 eliminates 1 of the 3, A1 eliminates 2 of the 3 and in the absence of a 3, 4, or 5 unit selection all 3 pulses are entered. A reset of this circuit results when SS–6 goes off and all triggers are restored to the off condition except T6.

The proportional space counter 43, FIG. 2, is made up with five stages of type 6211 tubes P1–P5 and an extra stage, single shot SS8, for use in the blocking action on the basic counter 36 when the space counter goes from the 5th to the home position.

The "OR" circuit 88, FIG. 2, is controlled by the negative output of any one of the counter positions P2–P5 being "on" to give proper conditioning to "AND" circuits 90, etc. FIG. 3.

Figure 7:
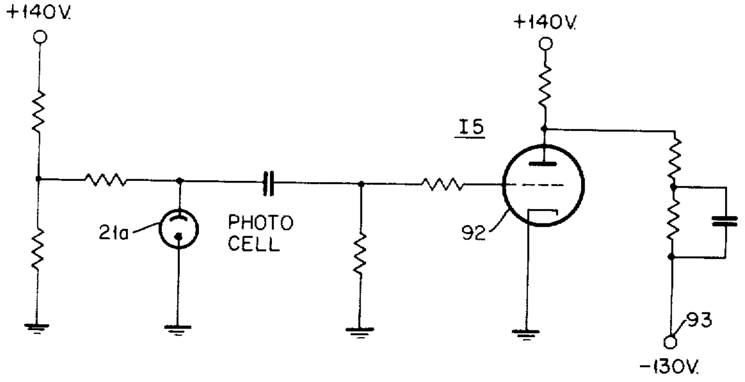
FIG. 7 shows the circuit for the photoelectric pickup portion of the proportional spacing controls.

The inverters, I1–I5, FIGS. 2 and 7, act as gates for the photoelectric circuits and they are each connected as shown at the top of FIGURE 2 so that when a photocell 21*a* receives light the inverter I5 emits a position output pulse to finally complete the conditioning of a related photocell "And" circuit such as A circuit 45 which is already preconditioned. The actual photocell and inverter circuitry is shown in FIG. 7 where the output line 93 is seen to involve control by tube 92. The type 6211 tube is used for the inverter and a Continental Electric type CE 705 C2 photocell may be used for the light detecting portion of the circuit.

The basic counter 36, FIG. 5, includes eighty stages of a sequentially acting ring circuit which is progressed in effect by stepping of the "on" condition toward the higher stages.

A cable 78, FIG. 5, connects the parallel outputs of the eighty column lines from the basic counter stages 36 up to the eighty gates AG1–AG80 which are composed of type 5687 tubes connected between the master gate 41 (which is a type 1680 tube) and the several light sources 13 which are of the neon or mercury vapor variety.

The gate coupling stages 90, FIG. 3, are made up of negative "And" circuits composed of diodes connected as shown more particularly in the last position of —AND 79.

In FIG. 6 the electronic reset circuit 85 for the several sets of triggers and ring counter elements is shown in greater detail. It is noted that attendant on either the closure of the main switch PS to start the recording device motor M or the activation of SS7 upon the flashing of a recording light, an inverter 65 or 66 is pulsed and on line 67 there is a drop in voltage with consequent cutoff of tube 69 which is of type 6AQ5 and has a pair of reset connections 70 and 71 labeled "ER" which rise in potential from −100 to about +10 v. and (when connected by plugging) cause resetting of triggers at the points marked "ER" in FIGS. 2, 4 and 5 and elsewhere. The tube 68 is of the type 1680 and has circuitry with a stabilizing effect on the output control of tube 69 and for that purpose is connected to the grid and plate of tube 69.

A contact such as 64 may be key-operated for resetting control at the end of lines, paragraphs, etc., for complete flexibility of control.

In FIG. 7 there is shown the photocell inverter circuit I5. The connections between the photocell 21*a* (which may be a Continental Electric type CE 705 C2) and the tube 92 are such as to cause a sudden rise in potential at output terminal 93 when light is thrown on the element of 21*a* as directed through the tape. This potential rise at point 93 is combined with other controls in the "AND" circuit 45, FIG. 2, to influence the operation of the single shot SS5 as already explained.

The means for supplying the rather heavy demand of the core matrix is shown in FIG. 8. There it is seen that the readin current driver CDA is a tube of the duplex pentrode type 6197 to which there is a parallel input and a combined output through one core line 62 such as that influencing the cores A1 to A80 of the matrix shown in FIG. 5.

In the output lines of the core matrix and between the horizontal lines and trigger 39 there are buffer amplifiers such as the BA1, FIG. 9. The core readout pulse is regulated in its effect on the grid of a type 6AU6 tube by a voltage divider 95. The resulting change in the plate circuit through line 37 causes operation of the trigger 39, FIG. 3, to operate the master gate 41 with the coarse degree of timing awaiting the final complete action of the gate for recording when the photocell and proportional space line 47 is activated.

The timing chart, FIG. 10, is in two sections illustrating the sequence of operation of the electronic controls at the top and the Xerographic recording operations at the bottom. The timing values of the spaces in the horizontal direction are quite different for the different sections, at the top each division represents 20 microseconds and at the bottom each division represents 50 milliseconds.

The top Typing Readin Cycle is repeated for a line of letters extending across the eighty letter spaces of recording area, i.e., about eighty typing cycles take place before each Recording Cycle of dusting, viewing, etc.

As soon as the switch PS, FIG. 6, is closed, the multivibrator MV is started and the motor M, FIG. 1, operates the emitter 16, the tape T, and all other constantly moving recording controls. Since the contacts 64, FIG. 6, are also operated with the switch, there is an immediate operation of the electronic reset circuit 85 with consequent resetting of te counters 36 and 43 and other control triggers. With counter 36, FIG. 5, reset to the "1" condition, the associated column 1 "AND" circuit 75 and the first gate AG1, FIG. 3, are half conditioned and ready for an initial character selection. Depression of a key such as A key 35, FIG. 5, operates the pulsing devices CC1 and SS2 which fully condition the "AND" circuits 75 and 76 and operate the core drivers CD1 and CDA with combined effect on core A1 which is flipped.

In the meantime, the emitter 16, FIG. 3, has been operating but it is only when the scanning brush 34 therein contacts with connections to the line 33, which is the diagonal wire through the flipped core A1, that the core readout SS4 is turned on and along therewith is operated the thyratron THA, the core readout to buffer BA1, and the gate control trigger 39, FIG. 3.

Trigger 39 serves to condition the master gate 41 and the several photocell "AND" circuits 45, FIG. 2. The proportional space counter 43 further conditions a selected one of the circuits 45 and the film tape T continues to move until the selected photocell 21*a* is activated to complete the triple conditioning of the particular "AND" circuit 45 and its connected SS5.

SS5 then completes the conditioning of gate 41, FIG. 3, and that in turn completes the condition of the particular arc light gate AG1. When there is a value in the proportional space counter 43, FIG. 2, other than "1" there is simultaneous conditioning of a supplemental "AND" circuit such as circuit 90, FIG. 3, by the "OR" circuit 88, FIG. 2. In the present instance of the example of counter 43 at "1" only one arc light 13 is fired and that is the one at the number 1 position of the eighty. This serves to direct the beam of the character through the tape and onto the charged web 23, FIG. 1.

As soon as the key was depressed it operated certain proportional spacing control contacts 56, 57 or 58, FIG. 4, and selected a trigger T1–T3, cathode follower K1–K3 and partly unconditioned a "—AND" circuit A1, A2 or A3 to limit the number of pulses derived from the ring circuit 84 to 0 for a five unit letter, 1 for a four unit letter, 2 for a three unit letter and all 3 for a two unit letter key which maintains all "AND" circuits effective.

When gate 41, FIG. 3, goes off, it switches on the SS6, FIG. 4, which in turn conditions the MV "AND" circuit 83 and allows the pulsing of the ring circuit 84 to pass selectively through A1 to A3 and line 59, FIG. 2, to the proportional spacing counter 43. The counter is stepped to indicate the space saved by the use of a narrow character. For example, if a 2 unit letter is followed by a 3 unit letter there is a saving of 5 unit spaces and the counter is pulsed 5 times to effect blocking action of the basic counter 36 which would otherwise use all eighty letter spaces sequentially and without saving of gained space. With less than a count of 5 in counter 43, the proper stage P2 to P5 is conditioned, and then in turn the "OR" circuit 88 and the related "AND" circuit 146 to 149 are also conditioned in readiness for the next recording.

Should the count in counter 43 be "5," then as stage P5 goes off, SS8 goes on and it conditions the switch S, FIG. 5, for negative or blocking action in series with the basic counter 36. Ordinarily, when SS6 goes off, FIG. 4, through line 86 there is a pulse for stepping counter 36 through switch S. SS6 also resets all the triggers through action of SS7 and the electronic reset devices 85, FIG. 6.

Depression of another character key repeats the foregoing steps starting with the fourth line of the top chart in FIG. 10.

The bottom recording chart of FIG. 10 shows the progressive steps of Xerographic recording already referred to with reference to FIG. 1. Some of the steps shown are of indefinite length of time because they concern typing, viewing and retyping of variable speed. The charging, dusting and heating steps are of a more definite mechanical nature and are of a limited period.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A matrix device comprising an array of memory elements wherein each element is adapted to assume one of two stable conditions to represent information data in response to the application of electrical impulses of predetermined polarity and magnitude, said elements being arranged in coordinate rows and columns with a plurality of conducting lines including one line for each row and one line for each column of said array and each memory element forming a junction device connected to the corresponding row and column lines, and having, in combination, a typewriter keyboard and electrical impulse controls directly operated thereby for applying impulses to said lines to select character letter data and cause a selected memory element to change from one to the other stable condition, said electrical impulse controls being characterized by the provision of an electronic stepping switch, the stages of which are representative of successive letter spaces and connected to each related column line at successive cycles, and including means for recording letters on a record receiving medium and means for applying a data representing impulse to a selected one of said row lines, whereupon the impulses applied to both connections of a selected one of said memory elements are coincident and effective to cause a change in the condition of the selected element and control said recording means for operation of recording letter by letter on said record receiving medium.

References Cited by the Examiner

UNITED STATES PATENTS

| | | | |
|---|---|---|---|
| 2,865,270 | 12/58 | Higonnet | 95—4.5 |
| 2,876,687 | 3/59 | Higonnet | 95—4.5 |
| 2,902,677 | 9/59 | Counihan | 340—166 |
| 2,918,655 | 12/59 | Pulvari | 340—166 |
| 2,992,410 | 7/61 | Groth | 340—166 |
| 3,046,530 | 7/62 | Kelner | 340—174 |

FOREIGN PATENTS

| | | |
|---|---|---|
| 1,113,397 | 12/55 | France. |

NORTON ANSHER, *Primary Examiner.*

DELBERT B. LOWE, JOHN M. HORAN, *Examiners.*